United States Patent
Norberg et al.

(10) Patent No.: US 12,523,274 B2
(45) Date of Patent: Jan. 13, 2026

(54) TRANSMISSION POWERTRAIN VEHICLE AND METHOD

(71) Applicant: Traton AB, Södertälje (SE)

(72) Inventors: Peer Norberg, Huddinge (SE); Gustav Göransson, Södertälje (SE); Paolo Fornaseri, Hägersten (SE); Per Arnelöf, Vendelsö (SE)

(73) Assignee: Traton AB, Södertälje (SE)

( * ) Notice: Subject to any disclaimer, the term of this patent is extended or adjusted under 35 U.S.C. 154(b) by 0 days.

(21) Appl. No.: 18/842,842

(22) PCT Filed: Mar. 13, 2023

(86) PCT No.: PCT/SE2023/050223
§ 371 (c)(1),
(2) Date: Aug. 30, 2024

(87) PCT Pub. No.: WO2023/177342
PCT Pub. Date: Sep. 21, 2023

(65) Prior Publication Data
US 2025/0172194 A1    May 29, 2025

(30) Foreign Application Priority Data
Mar. 16, 2022    (EP) ..................................... 22162505

(51) Int. Cl.
*F16H 3/54* (2006.01)
*F16H 1/28* (2006.01)

(52) U.S. Cl.
CPC ..................... *F16H 1/28* (2013.01)

(58) Field of Classification Search
CPC ...... F16H 3/46; F16H 3/54; F16H 2200/2033; F16H 2200/2035
See application file for complete search history.

(56) References Cited

U.S. PATENT DOCUMENTS

| | | | |
|---|---|---|---|
| 4,440,042 A * | 4/1984 | Holdeman | F16H 37/046 475/346 |
| 4,569,252 A * | 2/1986 | Harper | F16H 3/78 475/299 |

(Continued)

FOREIGN PATENT DOCUMENTS

| | | | |
|---|---|---|---|
| DE | 4121709 A1 * | 1/1992 | F16H 3/54 |
| WO | 03038296 A2 | 5/2003 | |
| WO | 2009079527 A1 | 6/2009 | |

OTHER PUBLICATIONS

Scania CV AB, European Patent Application No. 22162505.6, Extended European Search Report, Sep. 2, 2022.

(Continued)

*Primary Examiner* — Stacey A Fluhart
(74) *Attorney, Agent, or Firm* — Moore & Van Allen PLLC; W. Kevin Ransom

(57) ABSTRACT

The disclosure concerns a transmission comprising an input shaft, an output shaft, and a planetary gearset. The planetary gearset comprises a sun gear connected to the input shaft, a ring gear that is axially movable, and at least one planet gear rotatably supported on a planet gear carrier that is connected to the output shaft. The transmission comprises a coupling disc connected to the input shaft, an axially moveable coupling sleeve, and a synchronizer ring arranged between the coupling sleeve and the ring gear. The synchronizer ring is configured to transfer an axial motion of the ring gear in a first direction towards the coupling sleeve and the coupling disc. The coupling sleeve is moveable into an engaged position with the coupling disc at least in part by the synchronizer ring.

21 Claims, 8 Drawing Sheets

(56) References Cited

U.S. PATENT DOCUMENTS

| | | | | |
|---|---|---|---|---|
| 4,667,538 | A | * | 5/1987 | Larsson .................... F16H 3/54 475/299 |
| 4,976,671 | A | * | 12/1990 | Andersson ................ F16H 3/54 475/299 |
| 5,083,993 | A | * | 1/1992 | Oun .......................... F16H 3/78 192/48.91 |
| 5,390,347 | A | * | 2/1995 | Buri .......................... F16H 3/78 475/303 |
| 5,613,587 | A | | 3/1997 | Baxter, Jr. |
| 5,871,415 | A | * | 2/1999 | Fuhrer .............. F16H 57/02 475/331 |
| 6,248,038 | B1 | * | 6/2001 | Nilsson .................... F16H 3/60 475/299 |
| 6,896,638 | B2 | | 5/2005 | Nilsson |
| 7,160,221 | B2 | * | 1/2007 | Alfredsson ............... F16H 3/78 475/299 |
| 2003/0040393 | A1 | * | 2/2003 | Alfredsson ........... F16H 37/046 475/209 |
| 2005/0009660 | A1 | * | 1/2005 | Nishiji ............... B60K 17/3467 475/198 |
| 2010/0267508 | A1 | * | 10/2010 | Hvolka ..................... F16H 3/78 475/149 |

OTHER PUBLICATIONS

Scania CV AB, International Patent Application No. PCT/SE2023/050223, International Search Report, May 26, 2023.

Scania CV AB, International Patent Application No. PCT/SE2023/050223, Written Opinion, May 26, 2023.

Scania CV AB, International Patent Application No. PCT/SE2023/050223, International Preliminary Report on Patentability, Sep. 10, 2024.

* cited by examiner

US 12,523,274 B2

TRANSMISSION POWERTRAIN VEHICLE AND METHOD

CROSS-REFERENCE TO RELATED APPLICATIONS

This application is a National Stage Patent Application (filed under 35 § U.S.C. 371) of PCT/SE2023/050223, filed Mar. 13, 2023, of the same title, which, in turn claims priority to Europe Patent Application No. 22162505.6 filed Mar. 16, 2022, of the same title; the contents of each of which are hereby incorporated by reference.

TECHNICAL FIELD

The present invention relates to a transmission. The invention further relates to a powertrain for a vehicle and to a vehicle comprising a powertrain. Furthermore, the invention relates to a method of shifting a transmission.

BACKGROUND

One or more transmissions are utilised along a powertrain of a vehicle to adapt an output of a torque source, such as an internal combustion engine and/or an electric machine, to the drive wheels of the vehicle.

A transmission may be shifted into different gears in order to adapt the torque and rotational speed provided by the torque source to the drive wheels of the vehicle depending on current driving and/or operating conditions of the vehicle.

Shifting of gears may be manually or automatically initiated and/or performed. Actuators of the transmission may shift gears in the transmission upon manual or automatic input to the transmission. The actuators may be controlled by a control unit which determines when gear shifting is due and which automatically shifts gears in the gearbox.

In order to shift gears, the rotational speeds of at least a first component of the transmission and a second component have to be synchronized. This may be done in different ways e.g., with a mechanical synchronisation mechanism utilizing friction for synchronizing the relevant components, or by controlling the matching of the rotational speeds of the relevant components under the control of a control unit of the transmission. In the former case, reference is made to synchronized gears and in the latter case, reference is made to unsynchronized gears. One and the same transmission may comprise synchronized gears as well as unsynchronized gears.

A transmission may comprise at least one section of gears. One or more further sections of gears may be arranged downstream or upstream of the one section of gears. The one section of gears may comprise a planetary gearset, which may be shifted between a low gear and a high gear. The one section of gears may form a so-called range section of a transmission.

One example of a transmission in the form of a transfer case comprising a planetary gearset is disclosed in WO 2009/079527.

SUMMARY

In modern vehicles space is sparse. Small sized transmissions are thus, easier to build into modern vehicles.

It would be advantageous to achieve a transmission that provides conditions for enabling a small sized transmission. In particular, it would be desirable to enable mechanical synchronization in a transmission within limited dimensions. To better address one or more of these concerns, one or more of a transmission, a powertrain, a vehicle comprising a powertrain, and a method of shifting a transmission having the features defined in one or more of the independent claims is provided.

According to an aspect of the invention, there is provided a transmission comprising an input shaft, an output shaft, and a planetary gearset being driven by the input shaft and being couplable to the output shaft in a high gear mode and a low gear mode of the transmission, the input and output shafts being arranged rotatably and coaxially along an axis. The planetary gearset comprises a sun gear connected to the input shaft, a ring gear that is axially movable, and at least one planet gear rotatably supported on a planet gear carrier that is connected to the output shaft. The transmission further comprises a coupling disc connected to the input shaft, an axially moveable coupling sleeve being configured to selectively connect the planet gear carrier with the coupling disc in an engaged position of the coupling sleeve to provide the high gear mode, and a synchronizer ring arranged between the coupling sleeve and the ring gear. The synchronizer ring is configured to transfer an axial motion of the ring gear in a first direction towards the coupling sleeve and the coupling disc. The coupling sleeve is moveable from an unengaged position into the engaged position at least in part by the synchronizer ring.

Since the transmission comprises the coupling disc connected to the input shaft, since the synchronizer ring is configured to transfer an axial motion of the ring gear in a first direction towards the coupling sleeve and the coupling disc, and since the coupling sleeve is moveable from an unengaged position into the engaged position at least in part by the synchronizer ring—a compact mechanically synchronized transmission is provided. A length of the transmission along the axis is only affected by the coupling disc and as such the axial extension beyond that of the planetary gearset itself is limited. Particularly so, since the synchronizer ring and at least part of the coupling sleeve fit within the axial extension of the planetary gearset as such.

According to a further aspect of the invention, there is provided a powertrain for a vehicle comprising at least one torque source having a rotor, the rotor being connected to a transmission according to any one of aspects and or embodiments discussed herein.

Since the powertrain includes a transmission according to any one of aspects and or embodiments discussed herein, the powertrain provides at least some of the advantages of the transmission, such as that of the compact format of the transmission.

According to a further aspect of the invention, there is provided a vehicle comprising a powertrain according to any one of aspects and or embodiments discussed herein.

Thus, since the powertrain of the vehicle includes a transmission according to any one of aspects and or embodiments discussed herein, at least some of the advantages of the powertrain and the transmission, such as that of the compact format of the transmission are utilised in the vehicle.

Accordingly, the transmission may form part of a powertrain of a vehicle. A torque source of the powertrain may be connected directly or indirectly to the input shaft of the transmission. Downstream of the output shaft, the powertrain may comprise one or more drive wheels for propelling the vehicle. The torque source may form the only torque source of the vehicle. Alternatively, the torque source may form one of at least two torque sources of the vehicle.

Herein, the term vehicle relates to e.g., heavy goods vehicle, lorry, truck, pickup, van, wheel loader, bus, tracked vehicle, tank, quad bike, car or other similar motorized manned or unmanned vehicle, designed for land-based propulsion.

The transmission may comprise one or more further sections of gears in addition to the planetary gearset. The one or more further sections of gears may be arranged downstream or upstream of the planetary gearset.

In the high gear mode, the input shaft is connected to the output shaft and rotationally locked to the output shaft such that the input and output shafts rotate at the same rotational speed. In the high gear mode, the ring gear is rotatable with the synchronizer ring and the coupling disc. In the high gear mode, torque is transmitted from the input shaft via the coupling disc, the coupling sleeve, and the planet gear carrier to the output shaft.

In the low gear mode, the input shaft is connected to the output shaft via the at least one planet gear and the planet gear carrier while the ring gear is rotationally locked to a stationary portion of the transmission. In the low gear mode, torque is transmitted from the input shaft via the sun gear, the at least one planet gear, and the planet gear carrier to the output shaft.

In the low gear mode, no torque is transmitted via the coupling sleeve which is rotating with the planet gear carrier but not engaged with the coupling disc. This means that the coupling sleeve rotates with a lower rotational speed than the sun gear in the low gear mode. Accordingly, drag losses are reduced in the low gear mode.

The coupling disc is rotationally locked to the input shaft. The planet gear carrier is rotationally locked to the output shaft.

Terms used herein, such as axial extension, axially movable, circumferential, rotation, rotational direction, and other similar references are used in relation to the axis of the input and output shafts, if not otherwise noted.

The coupling disc as such has only a limited axial extension. The axial extension of the coupling disc may fit within a length of the input shaft along the axial extension. As such, the axial extension of the transmission may be extended to a limited and even negligible extent by the coupling disc.

The coupling sleeve and the synchronizer ring are arranged to rotate with the planet gear carrier.

The coupling sleeve and the synchronizer ring may be rotationally locked to the planet gear carrier.

The synchronizer ring is sometimes referred to as a latch cone. The ring gear is sometimes be referred to as an annular gear.

The synchronizer ring is configured for frictional engagement with the ring gear. Thus, during shifting the transmission into the high gear mode, as the ring gear is moved in the first direction, the frictional engagement between the rotating synchronizer ring and the ring gear, causes the ring gear to rotate at the same rotational speed as the coupling sleeve, the synchronizer ring, and the planet gear carrier.

Since the synchronizer ring is configured to transfer the axial motion of the ring gear in the first direction and since the synchronizer ring is arranged between the coupling sleeve and the ring gear, the coupling sleeve is moveable from the unengaged position into the engaged position at least in part by the synchronizer ring.

Put differently, the coupling sleeve being moveable from an unengaged position into the engaged position at least in part by the synchronizer ring, means that the coupling sleeve is moveable from an unengaged position into the engaged position directly and/or indirectly by the synchronizer ring.

An actuator, such as a hydraulic, pneumatic, or electric actuator may be arranged to move the ring gear in the first direction. A further option may be to manually actuate the ring gear to move in the first direction.

The actuator may be controlled by a control unit. The control unit may determine when gear shifting is due, such as shifting between low and high gear modes. Alternatively, or additionally, the control unit may be configured to receive manual input causing the control unit to control specific actuators to shift one or more gears in the transmission.

According to a further aspect of the invention, there is provided a method of shifting a transmission according to any of aspects and/or embodiments discussed herein. Accordingly, the transmission comprises an input shaft, an output shaft, and a planetary gearset being driven by the input shaft and being couplable to the output shaft in a high gear mode and a low gear mode of the transmission, the input and output shafts being arranged rotatably and coaxially along an axis. The planetary gearset comprises a sun gear connected to the input shaft, a ring gear that is axially movable, and at least one planet gear rotatably supported on a planet gear carrier that is connected to the output shaft. The transmission further comprises a coupling disc connected to the input shaft, an axially moveable coupling sleeve, and a synchronizer ring arranged between the coupling sleeve and the ring gear. In order to connect the planet gear carrier with the coupling disc in an engaged position of the coupling sleeve to provide the high gear mode, the method comprises steps of:

moving the ring gear in an axial motion in a first direction towards the coupling sleeve and the coupling disc, transferring via the synchronizer ring the axial motion of the ring gear to the coupling sleeve, at least partially moving the coupling sleeve with the synchronizer ring from an unengaged position towards the engaged position.

Accordingly, shifting into a high gear mode of a compact transmission is provided.

According to embodiments, the synchronizer ring may be arranged to engage with the coupling sleeve in a circumferential direction and arranged with a rotational play in relation to the coupling sleeve. In this manner, the synchronizer ring may be arranged in different rotational positions in relation to the coupling sleeve. This may be utilised for controlling axial movement of the synchronizer ring, preventing axial movement of the synchronizer ring in one relative rotational position and permitting axial movement in a different relative rotational position.

According to embodiments, the rotational play may also be utilised for controlling axial movement of the coupling sleeve into engagement with the coupling disc. Namely, the rotational play may be utilised for permitting a relative rotation between the coupling sleeve and the synchronizer ring, such that the coupling sleeve may be permitted to rotate in relation to the coupling disc for reaching the engaged position.

The rotational play provides a clearance in the rotational direction. The rotational play provides a limited relative rotational shift between the synchronizer ring and coupling sleeve.

Since the coupling sleeve may be rotationally locked to the planet gear carrier, the synchronizer ring may also be arranged with a rotational play in relation to the planet gear carrier.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
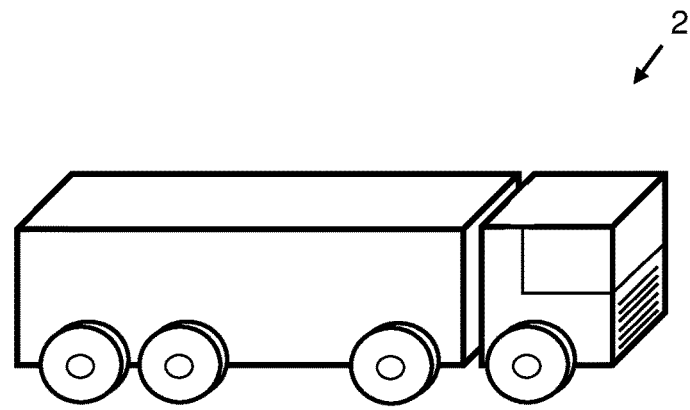
FIG. 1 schematically illustrates a land-based vehicle according to embodiments.

FIG. 1 schematically illustrates a land-based vehicle 2 according to embodiments. The vehicle 2 is a heavy goods vehicle. The vehicle 2 is configured to be propelled by a powertrain. The powertrain is a powertrain according to any one of aspects and or embodiments discussed herein.

During propelling of the vehicle 2 at different speeds, a transmission of the powertrain may be shifted into, and operated, in a high gear mode and a low gear mode, depending e.g., on a torque output from a torque source of the powertrain and a traveling speed of the vehicle 2.

Figure 2:
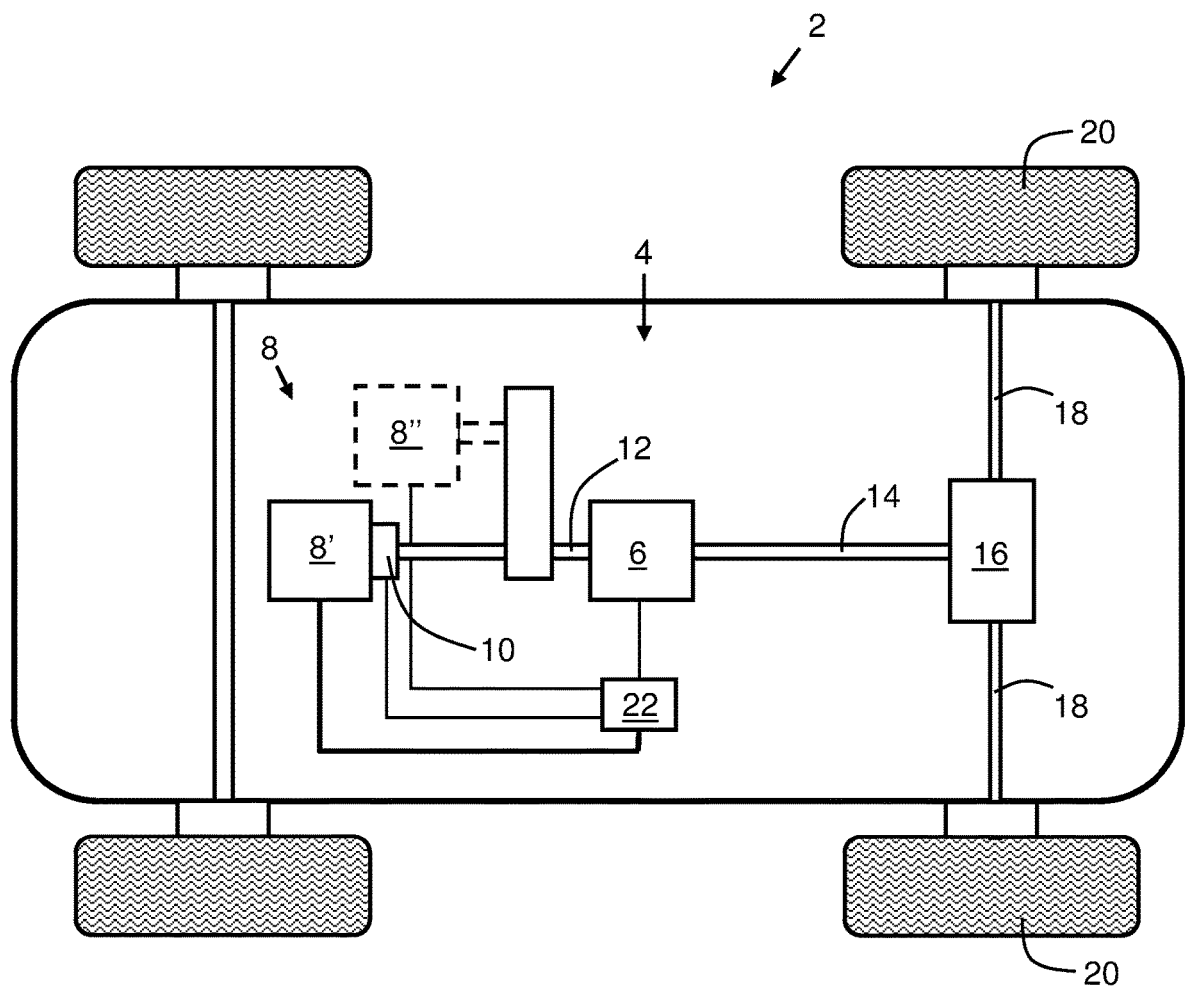
FIG. 2 schematically illustrates embodiments of a powertrain of a land-based vehicle, FIGS. 3a and 3b schematically illustrate embodiments of a transmission.

FIG. 2 schematically illustrates embodiments of a powertrain 4 of a land-based vehicle 2. The vehicle 2 may be a vehicle 2 as shown in FIG. 1.

The powertrain 4 comprises a transmission 6. The transmission 6 is a transmission according to any one of aspects and or embodiments discussed herein.

The powertrain 4 further comprises at least one torque source 8. According to embodiments, the at least one torque source may comprise an electric machine.

Alternatively, or additionally, the at least one torque source 8 may comprise an internal combustion engine (ICE).

In the illustrated example, the torques source 8 comprises a main torque source 8' and an additional torque source 8".

The main torque source 8' and/or the additional torque source 8" may comprise an electric machine.

Specifically, the at least one torque source includes a rotor. The rotor is connected to the transmission 6.

The rotor may comprise a rotor of an electric machine and/or a crankshaft of an ICE.

The powertrain 4 may comprise one or more further components. Mentioned purely as examples, the powertrain 4 may comprise one or more of a further transmission (not shown), a clutch 10, a shaft 12 leading to the transmission 6, a propeller shaft 14, a differential 16, drive axels 18, and drive wheels 20.

A control unit 22 may be provided for controlling at least the transmission 6. The control unit 22 may be configured to control shifting of gears in the transmission 6. The control unit 22 may be configured to shift gears based on input from a driver of the vehicle 2. Sensors for providing input to the control unit 22 may be connected to the control unit 22. Data from such sensors may be utilised by the control unit prior to, and/or during, a gear shifting process.

The control unit 22 may be configured to perform a method 100 as discussed inter alia below with reference to FIG. 8.

Figure 3A:
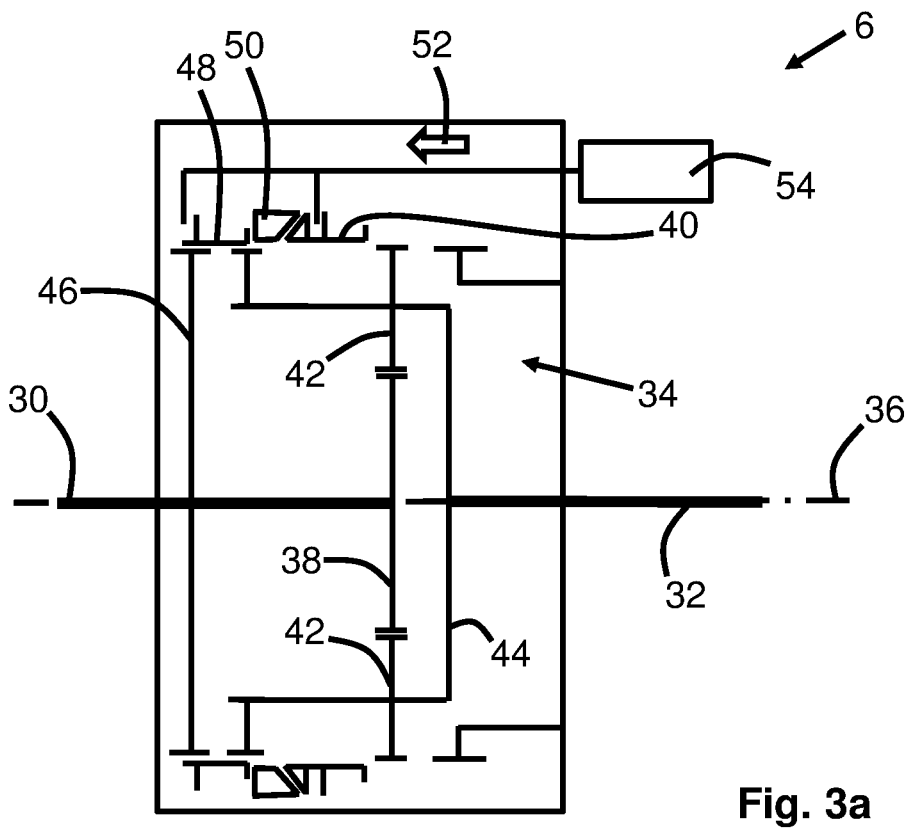
Figure 3B:
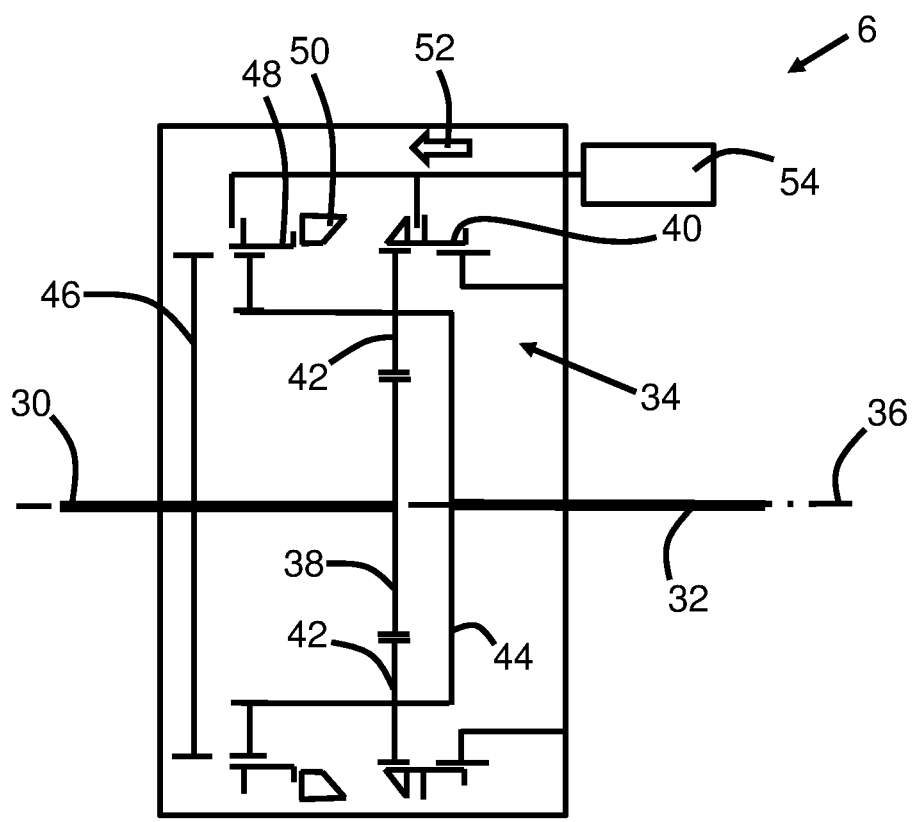

FIGS. 3a and 3b schematically illustrate embodiments of a transmission 6 of a powertrain for a vehicle. The transmission may be a transmission 6 of a powertrain as illustrated in FIG. 2.

The transmission 6 comprises an input shaft 30, an output shaft 32, and a planetary gearset 34. The input shaft 30 is arranged coaxially with the output shaft 32 along an axis 36. The planetary gearset 34 is driven by the input shaft 30, which is couplable to the output shaft 32 in a high gear mode and a low gear mode of the transmission 6.

The high gear mode is shown in FIG. 3a and the low gear mode is shown in FIG. 3b.

The transmission may comprise one or more further gear stages (not shown) connected to the input shaft 30 and/or to the output shaft 32. Such further gear stages may comprise shiftable and/or non-shiftable gears.

The planetary gearset 34 comprises a sun gear 38, a ring gear 40, at least one planet gear 42, and a planet gear carrier 44.

The sun gear 38 is connected to the input shaft 30 and rotationally locked to the input shaft 30. The ring gear 40 is axially movable along the axis 36. The at least one planet gear 42 is rotatably supported on the planet gear carrier 44. The planet gear carrier 44 is fixedly connected to the output shaft 32 and thus, rotationally locked to the output shaft 32.

The transmission 6 further comprises a coupling disc 46, a coupling sleeve 48, and a synchronizer ring 50. The synchronizer ring 50 may also be referred to as a high gear synchronizer ring 50.

The coupling disc 46 is fixedly connected to the input shaft 30 and thus, rotationally locked to the input shaft 30. The coupling sleeve 48 is axially moveable. The coupling sleeve 48 is configured to connect the planet gear carrier 44 with the coupling disc 46 in an engaged position. In the engaged position of the coupling sleeve 48, the high gear mode of the transmission 6 is provided.

The synchronizer ring 50 is arranged between the coupling sleeve 48 and the ring gear 40. The synchronizer ring 50 is configured to transfer an axial motion of the ring gear 40 in a first direction 52. The first direction 52 extends in a direction from the ring gear 40 towards the coupling sleeve 48 and the coupling disc 46. The first direction 52 extends in parallel with the axis 36. Accordingly the first direction 52 may alternatively be referred to as a first axial direction 52.

The coupling sleeve 48 is moveable from an unengaged position into the engaged position at least in part by the synchronizer ring 50.

Accordingly, in the high gear mode (FIG. 3a), the input shaft 30 is coupled to the output shaft 32 via the coupling disc 46, the coupling sleeve 48 in its engaged position with the coupling disc 46, and the planet gear carrier 44. Thus, in the high gear mode, a ratio of the transmission is 1:1 from the input shaft 30 to the output shaft 32.

The ring gear 40 and the synchronizer ring 50 are utilised for shifting the transmission into the high gear mode as will be further discussed below with reference to FIGS. 4a-7.

In the low gear mode (FIG. 3b), the input shaft 30 is coupled to the output shaft 32 via the sun gear 38, the at least one planet gear 42, and the planet gear carrier 44. In the low gear mode, the ring gear 40 is rotationally locked to a stationary portion of the transmission 6, such as to a housing of the transmission 6. Also, the ring gear 40 is positioned to engage with the at least one planet gear 42. Thus, in the low gear mode, a rotational speed reduction is provided by the transmission 6 from the input shaft 30 to the output shaft 32. The reduction of rotational speed is determined by the number of teeth of the sun gear 38, the at least one planet gear 42, and the ring gear 40.

In the high gear mode, the ring gear 40 does not form part of a torque transmission path through the planetary gearset 34. The torque transmission path, in the high gear mode, leads via the coupling sleeve 48 directly from the coupling disc 46 to the planet gear carrier 44.

In the low gear mode, the ring gear 40 is included in a torque transmission path through the planetary gearset 34. Since, the ring gear 40 in the low gear mode is fixed in relation to a stationary portion of the transmission 6 and with the at least one planet gear 42 engaged with the ring gear 40, the ring gear 40 forms a counter member for engagement of the at least one planet gear 42 as the sun gear 38 rotates the at least one planet gear 42 in the planet gear carrier 44.

The ring gear 40 may have an intermediate position. In the intermediate position the ring gear 40 is neither engaged with the stationary portion of the transmission 6 nor with the synchronizer ring 50.

An actuator 54 is arranged for shifting the transmission 6 into the high gear mode. That is, the actuator 54 is arranged for moving the ring gear 40 axially in the first direction 52 to cause the coupling sleeve 48 to engage with the coupling disc 46.

The actuator 54 may also be arranged for shifting the transmission 6 into the low gear mode. That is, the actuator 54 may be arranged for moving the ring gear 40 axially in a direction opposite to the first direction 52 to cause the ring gear 40 to engage with the at least one planet gear 42 and the stationary portion of the transmission 6.

A non-shown further synchronizer ring may be provided for reducing the rotational speed of the ring gear 40 to facilitate engagement between the ring gear 40 and the stationary portion of the transmission 6. See also below with reference to FIGS. 4a and 4b.

The actuator 54 may also be arranged to disengage the coupling sleeve 48 from the coupling disc 46.

The actuator 54 may be controlled by a control unit of the transmission 6. The actuator 54 may be activated upon input of a driver of the vehicle and/or by the control unit when a control algorithm of the control unit so dictates.

Figure 4A:
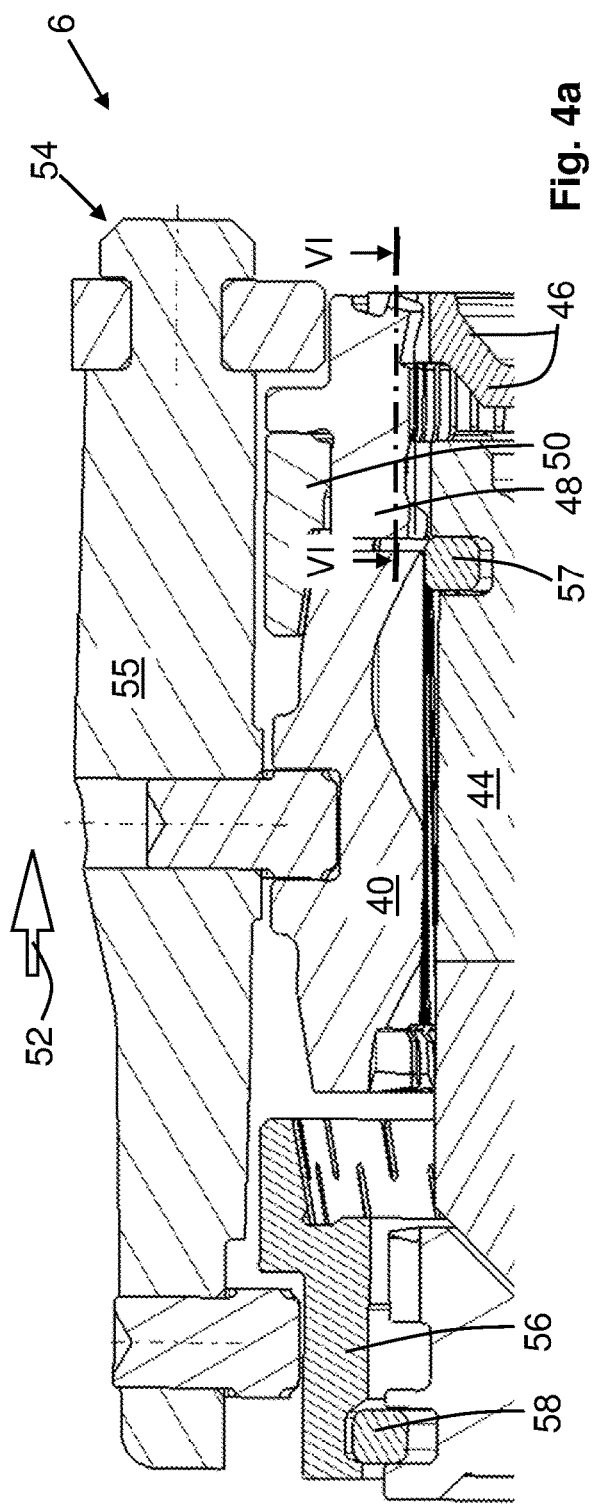
FIGS. 4a and 4b illustrate partial cross sections through a transmission according to embodiments.
Figure 4B:
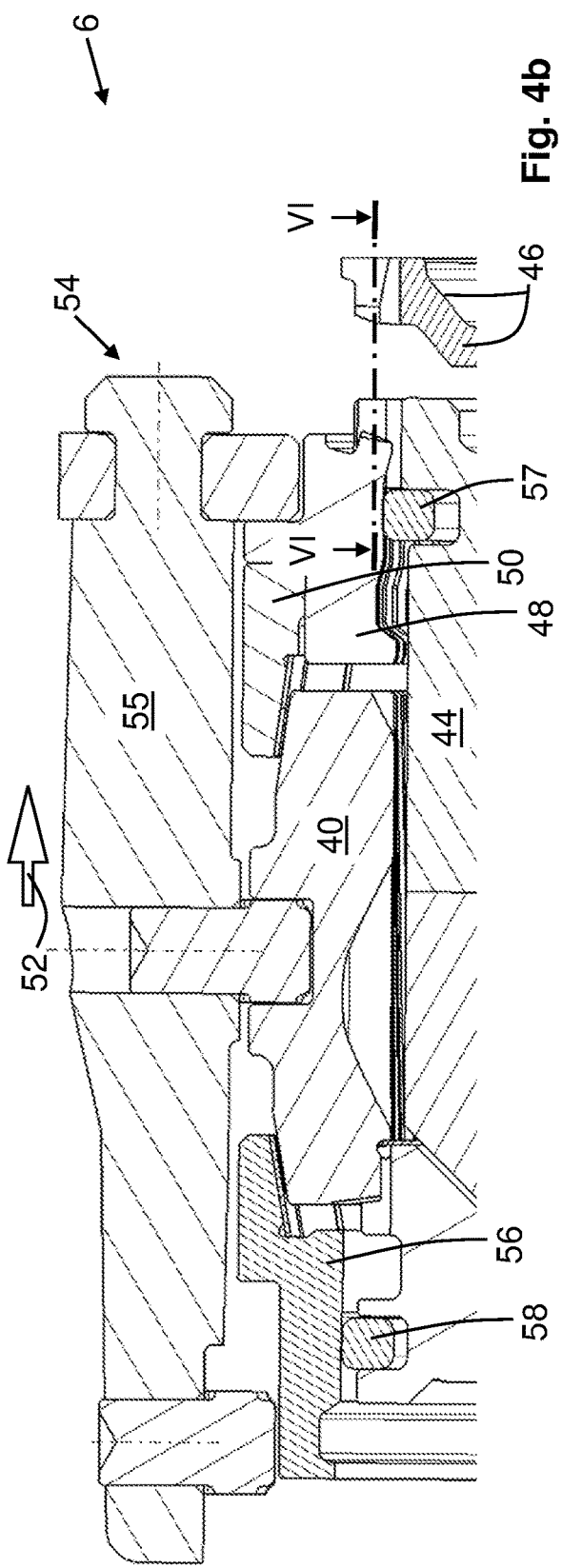

The transmission 6 may be provided in a compact format. As also shown in the context of FIGS. 4a and 4b below, the herein discussed transmission 6 only extends axially beyond the dimensions of the basic components of the planetary gearset 34, i.e. beyond the sun gear 38, the ring gear 40, the at least one planet gear 42, and the planet gear carrier 44, by an axial extension of the coupling disc 46. In a direction perpendicularly to the axis 36, the dimensions of the transmission 6 do essentially not have to extend beyond that of the basic components of the planetary gearset 34. At one angular position around a circumference of the ring gear 40, the actuator 54 may have to be arranged, at which angular position the transmission 6 may require to extend beyond the ring gear 40 in the direction perpendicularly to the axis 36.

FIGS. 4a and 4b illustrate partial cross sections through a transmission 6 according to embodiments. The transmission 6 may be a transmission as discussed above with reference to FIGS. 1-3b. Accordingly, in the flowing reference is also made to FIGS. 1-3b.

In FIG. 4a, the transmission 6 is shown in the high gear mode and in FIG. 4b, the transmission 6 is shown in the low gear mode.

With reference to FIG. 4a, in the high gear mode the coupling sleeve 48 is engaged with the coupling disc 46 and with the planet gear carrier 44.

During shifting into the high gear mode, the ring gear 40 is moved in the first direction 52 by the actuator 54 and the rotational speed of the ring gear 40 is synchronized with that of the planet gear carrier 44 by the synchronizer ring 50 which rotates with the planet gear carrier 44. For instance, a wire spring 57 abutting against the coupling sleeve 48 may provide resistance to axially moving the coupling sleeve 48 in the first direction 52, see FIG. 4b. The resistance is overcome by the actuator 54.

Since the synchronizer ring 50 is engaged with the coupling sleeve 48, also the synchronizer ring 50 will be subjected to resistance to axial movement in the first direction 52. During overcoming the resistance from the wire spring 57, the synchronizer ring 50 may be rotationally positioned in a blocking position in relation to the coupling sleeve 48. The blocking position is further discussed below with reference to FIG. 6a. The ring gear 40 is sped up in the rotational direction of the planet gear carrier 44 by frictional engagement with the synchronizer ring 50.

After rotational speed synchronization, the ring gear 40 is further moved in the first direction 52 and the coupling sleeve 48 is moved into the engaged position shown in FIG. 4a, directly and/or indirectly by the ring gear 40. That is, one and or both of the ring gear 40 and the synchronizer ring 50 may abut against the coupling sleeve 48 to transfer the movement in the first direction 52 of the ring gear 40.

Further details of the engagement between the coupling sleeve 48 and the coupling disc 46 are discussed below with reference to FIGS. 5a-7.

With reference to FIG. 4b, in the low gear mode, the ring gear 40 is engaged with a stationary portion of the transmission 6. Thus, the ring gear 40 is maintained stationary in the low gear mode. In FIG. 4b, a lefthand portion of the ring gear 40 is engaged with a stationary portion of the transmission 6.

During shifting into the low gear mode, the ring gear 40 is moved in a direction opposite to the first direction 52 and the rotational speed of the ring gear 40 is reduced to zero by a low gear synchronizer ring 56. The low gear synchronizer ring 56 is axially moveable and is only rotationally moveable to a limited degree to provide a blocking position. A wire spring 58 may provide resistance against axial movement of the low gear synchronizer ring 56 in an initial portion of the synchronization of the ring gear 40 during shifting into the low gear mode. The axial resistance is overcome by the actuator 54. When the rotation of the ring gear 40 has stopped, the ring gear 40 is further moved into engagement with stationary portion of the transmission 6.

A shift fork 55 forming part of the actuator 54 arranged for shifting the transmission 6 is shown in FIGS. 4a and 4b.

The shift fork 55 of the actuator 54 is arranged for moving the ring gear 40 axially in the first direction 52 to cause the coupling sleeve 48 to engage with the coupling disc 46 and thus, shift the transmission 6 into the high gear mode. The shift fork 55 of the actuator 54 is also arranged for moving the ring gear 40 axially in the direction opposite to the first direction 52 to cause the ring gear 40 to engage with a stationary portion of the transmission 6 and thus, shift the transmission 6 into the low gear mode.

Moreover, the shift fork 55 of the actuator 54 may be arranged to disengage the coupling sleeve 48 from the coupling disc 46. As shown in sequence in FIGS. 4a and 4b, the shift fork 55 of the actuator 54 engages with the coupling sleeve 48 and axially moves the coupling sleeve 48 out of its engaged position with the coupling disc 46 as the shift fork 55 of the actuator 54 is moved in the direction opposite to the first direction 52. Together with the coupling sleeve 48, also the synchronizer ring 50 is moved in the direction opposite to the first direction 52. Thus, the synchronizer ring 50 and the coupling sleeve 48, in FIG. 4c, are in position for shifting the transmission 6 into the high gear mode.

Similarly, as shown in FIG. 4a, the shift fork 55 of the actuator 54 may be arranged to axially move the low gear synchronizer ring 56 in the first direction 52 when the ring gear 40 is moved in the first direction 52. Thus, the low gear synchronizer ring 56 is in position for shifting the transmission 6 into the low gear mode.

Figure 5A:
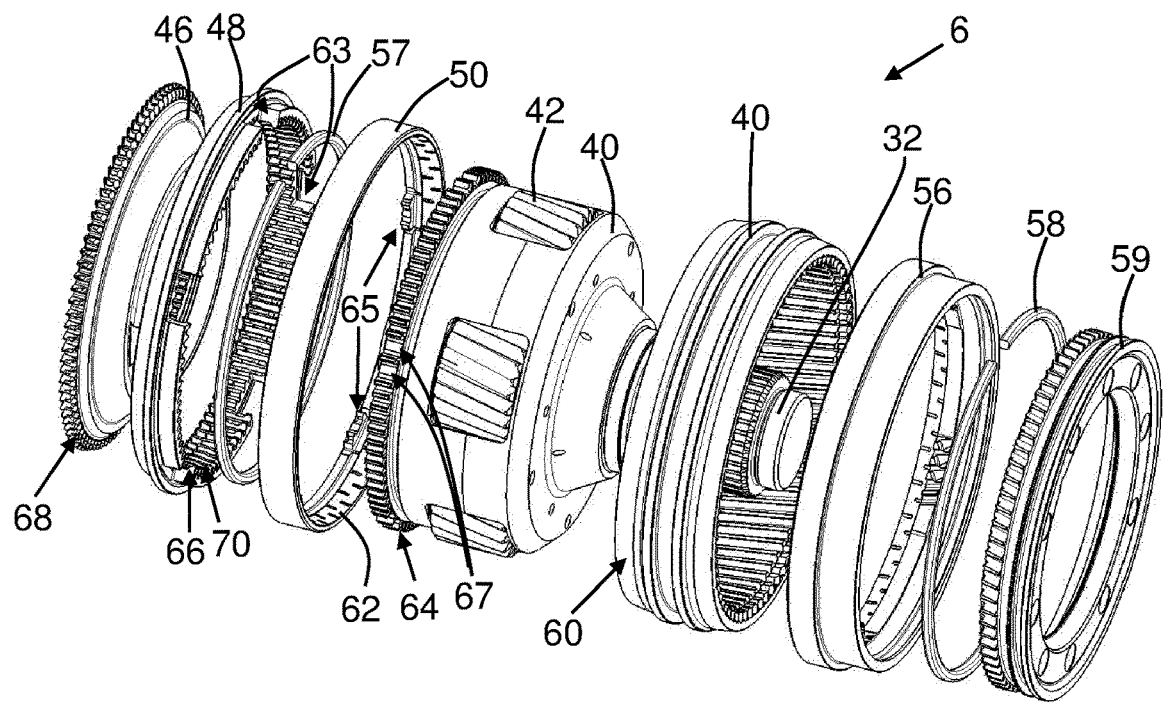
FIGS. 5a and 5b illustrate a transmission according to embodiments in two different exploded views.
Figure 5B:
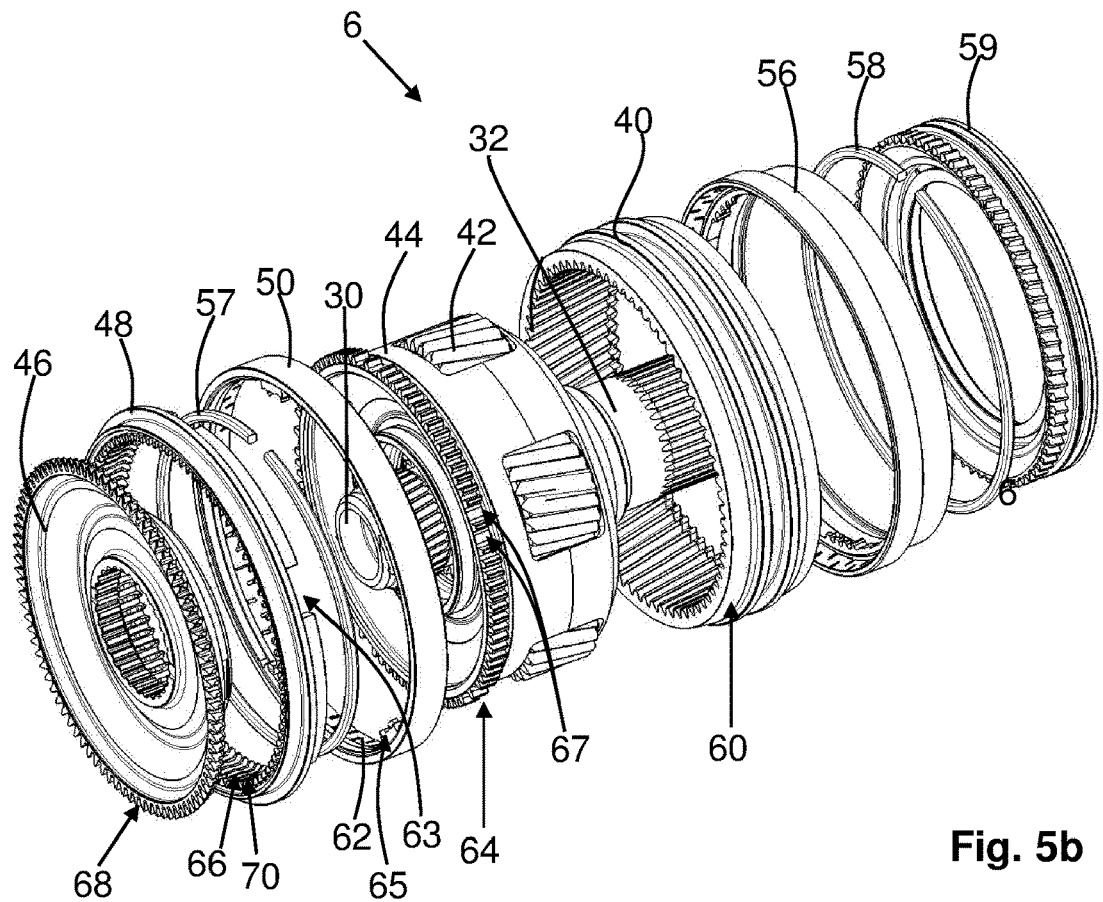

FIGS. 5a and 5b illustrate a transmission 6 according to embodiments in two different exploded views. The transmission 6 may be a transmission as discussed above with reference to FIGS. 1-4b. Accordingly, in the flowing reference is also made to FIGS. 1-4b.

Accordingly, from the left in FIGS. 5a and 5b, the transmission 6 comprises, the input shaft 30, the coupling disc 46, the coupling sleeve 48, the synchronizer ring 50, the planet gear carrier 44, the at least one planet gear 42, the ring gear 40, and the output shaft 32. The sun gear 38 is not visible in FIGS. 5a and 5b.

The transmission 6 may further comprise one or more of a high gear wire spring 57, a low gear synchronizer ring 56, a low gear wire spring 58, and a set of outer splines 59 included in a stationary portion of the transmission 6.

According to embodiments, the ring gear 40 may comprise an outer conical surface 60 and the synchronizer ring 50 comprises one or more inner surfaces 62 configured to abut against the outer conical surface 60. In this manner, the ring gear 40 and the synchronizer ring 50 may be brought to frictionally engage with each other via the outer conical surface 60 and the one or more inner surfaces 62.

The outer conical surface of the ring gear 40 and the one or more inner surfaces of the synchronizer ring 50 are also visible in FIGS. 4b and 4c.

For instance, the outer conical surface 60 may be a circumferentially continuously extending surface portion of the ring gear 40. The one or more inner surfaces 62 may form part of a lining, such as a carbon fibre lining, and/or may be surfaces of protrusions facing radially inwardly from the synchronizer ring 50.

According to embodiments, the coupling sleeve 48 may be rotationally locked to the planet gear carrier 44 by a first splined connection 64, 66. The first splined connection 64, 66 may comprise external splines 64 arranged on the planet gear carrier 44 and internal splines 66 arranged at a radially inner portion of the coupling sleeve 48. In this manner, the coupling sleeve 48 may be provided axially movable on the planet gear carrier 44 while being rotationally locked thereto.

The first splined connection 64, 66 may ensure that the coupling sleeve 48 rotates with the planet gear carrier 44.

The first splined connection 64, 66 may herein alternatively be referred to as the splined connection 64, 66 of the coupling sleeve 48 and the planet gear carrier 44.

The synchronizer ring 50 may be arranged to engage with the coupling sleeve 48 in a circumferential direction of the coupling sleeve 48. Thus, it may be ensured that the rotational speed of the ring gear 40 is synchronized with that of the coupling sleeve 48 and the synchronizer ring 50 before the coupling sleeve 48 is permitted to be move in the first direction 52 by the ring gear 40. The synchronizer ring 50 may take a blocking position while the rotational speed of the ring gear 40 is synchronized, as discussed below with reference to FIGS. 6a-6d.

Moreover, the synchronizer ring 50 may be arranged with a rotational play in relation to the coupling sleeve 48.

The rotational play is provided in combination by axial recesses 63 in the coupling sleeve 48, radially inwardly directed protrusions 65 in the synchronizer ring 50, and circumferential gaps 67 in the external splines 64 of the planet gear carrier 44.

The synchronizer ring 50 may be engaged with the coupling sleeve 48 at one or more circumferential positions of the synchronizer ring 50 and the coupling sleeve 48, such as at circumferential positions of the radially inwardly directed protrusions 65. That is, the radially inwardly directed protrusions 65 may extend radially inwardly through the circumferentially extending axial recesses 63 of the coupling sleeve 48.

See below with reference to FIGS. 6a-7 concerning details about the rotational play and how the coupling sleeve 48 is moved in the first direction 52 after synchronization of the ring gear 40.

According to embodiments, the coupling sleeve 48 and the coupling disc 46 may be engageable in the engaged position via a second splined connection 68, 70. The second splined connection 68, 70 may comprise external splines 68 arranged on the coupling disc 46 and internal splines 70 arranged at a radially inner portion of the coupling sleeve 48. In this manner, the engagement between the coupling sleeve 48 and the coupling disc 46 in the high gear mode of transmission 6 may be provided by the second splined connection 68, 70.

The second splined connection 68, 70 is selectively engageable to provide the high gear mode of the transmission 6.

The internal splines 70 of the coupling sleeve 48 of the second splined connection 68, 70 may form part of the internal splines 66 of the coupling sleeve 48 of the first splined connection 64, 66. Alternatively, the internal splines 70 of the coupling sleeve 48 of the second splined connection 68, 70 may be separate from the internal splines 66 of the coupling sleeve 48 of the first splined connection 64, 66.

See below with reference to FIGS. 6a-6d concerning details about how the engaged position of the coupling sleeve 48 with the coupling disc 46 is achieve with the second splined connection 68, 70.

The second splined connection 68, 70 may herein alternatively be referred to as the splined connection 68, 70 of the coupling sleeve 48 and the coupling disc 46.

FIGS. 6a-6d illustrate partial axially and circumferentially extending cross sections of the transmission 6 of FIGS. 4a-5b. The cross sections of FIGS. 6a-6d are taken along lines VI-VI in FIGS. 4b and 4c. Accordingly, the cross sections extend through the first and second splined connections 64, 66, 68, 70 of the planet gear carrier 44, the coupling sleeve 48, and the coupling disc 46, and through the radially inwardly directed protrusions 65 of the synchronizer ring 50, see discussion of FIGS. 5a and 5b above. In the following, reference is also made to FIGS. 3a-5b.

FIGS. 6a-6d also show steps of a method 100 of shifting a transmission as discussed below with reference to FIG. 8.

More specifically, in all of FIGS. 6a-6d there are shown:
- the external splines 64 of the planet gear carrier and the internal splines 66 of the coupling sleeve of the first splined connection,
- the external splines 68 of the coupling disc and the internal splines 70 of the coupling sleeve of the second splined connection,
- the protrusions 65 of the synchronizer ring, and
- the circumferential gaps 67 in the external splines 64 of the planet gear carrier.

FIGS. 6a-6d show how the coupling sleeve 48 reaches its engaged position with the coupling disc 46. Accordingly, FIGS. 6a-6d show relative axial and circumferential movements of the synchronizer ring 50 (comprising the protrusions 65) and the coupling sleeve 48 (comprising the internal splines 66, 70) in relation to the planet gear carrier 44 (comprising the external splines 64) and the coupling disc 46 (comprising the external splines 68).

As mentioned above, and as shown in FIGS. 6a-6d, the synchronizer ring 50 is arranged with a rotational play in relation to the coupling sleeve 48. More specifically, in FIGS. 6a-6d the inwardly directed protrusions 65 of the synchronizer ring 50 are shown in three different positions in relation to the internal splines 66, 70 of the coupling sleeve 48.

Also, the synchronizer ring 50 and the planet gear carrier 44 are configured such that the synchronizer ring 50 can change relative rotational position in relation to the planet gear carrier 44. The relative rotational positions are at least in part enabled by the circumferential gaps 67 in the external splines 64 of the planet gear carrier 44.

In FIGS. 6a-6d, the rotational direction of the planet gear carrier 44, the coupling sleeve 48, the synchronizer ring 50, and the coupling disc 46 is downwardly. During synchronization of the rotational speed of the ring gear 40 from zero to that of the planet gear carrier 44, the synchronizer ring 50 and its protrusions 65 are subjected by the ring gear 40 to an upwardly directed force in the figures. Thus, during synchronization, the synchronization ring 50 and its protrusions 65 are circumferentially positioned in relation to the coupling sleeve 48 such that the protrusions 65 are arranged at one circumferential end of the circumferential recess 63 of the coupling sleeve 48.

When the rotational speed of the ring gear 40 has been synchronized with that of the planet gear carrier 44 via the synchronizer ring 50 and the coupling sleeve 48, the at least one planet gear 42 does no longer rotate in relation to the sun gear 38 and the ring gear 40.

According to embodiments, in a blocking position of the synchronizer ring 50, the synchronizer ring 50 may be prevented from axial movement in the first direction 52. The blocking position may be maintained while there remains a rotational speed difference between the ring gear 40 on the one hand and the synchronizer ring 50 and the coupling sleeve 48 on the other hand. In this manner, since the coupling sleeve 48 is rotationally locked to the planet gear carrier 44, the synchronization of the ring gear 40 by the synchronizer ring 50 with planet gear carrier 44 and the coupling sleeve 44 may be ensured before the coupling sleeve 48 is permitted to move in the first direction 52.

In the blocking position the radially inwardly directed protrusions 65 of the synchronizer ring 50 may be at least partially axially aligned with at least some of the external splines 64 of the planet gear carrier 44. Thus, in the blocking position, the synchronizer ring 50 is prevented from moving in the first direction 52 by the splines 64. The blocking position remains as long as the rotational speed difference between the ring gear 40 and the planet gear carrier 44 remains.

Figure 6A:
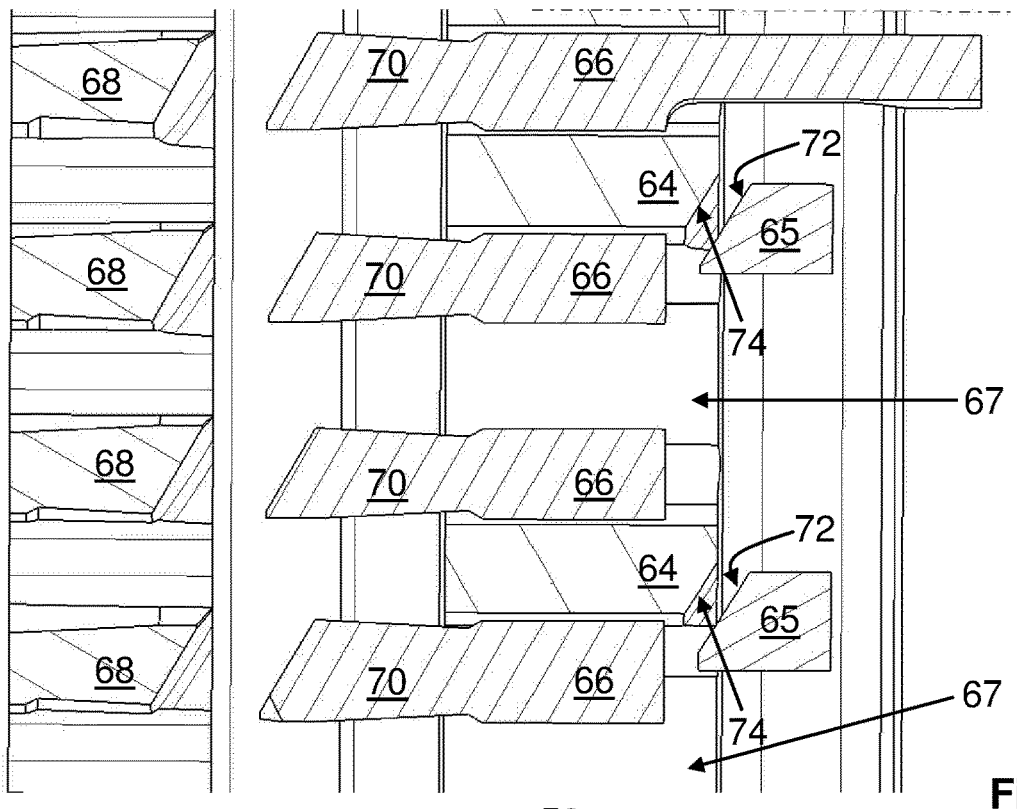
FIGS. 6a-6d illustrate partial axially and circumferentially extending cross sections of a transmission.

In FIG. 6a, the synchronizer ring 50 is in the blocking position. The protrusions 65 of the synchronizer ring 50 are at least partially aligned with the splines 64 and thus, prevented from being moved axially in between the splines 64 of the planet gear carrier 44.

According to embodiments, in a release position of the synchronizer ring 50, the synchronizer ring 50 may be axially moveable in the first direction 52. In the release position the coupling sleeve 48 is axially moveable in the first direction 52 by the synchronizer ring 50 and/or the ring gear 40. In this manner, movement of the coupling sleeve 48 in the first direction 52 toward its engaged position with the coupling disc 46 may be enabled when the rotational speed of the ring gear 40 has been synchronized with that of the planet gear carrier 44.

In the release position the protrusions 65 of the synchronizer ring 50 may be aligned with circumferential interspaces between the external splines 64 of the planet gear carrier 44.

Figure 6B:
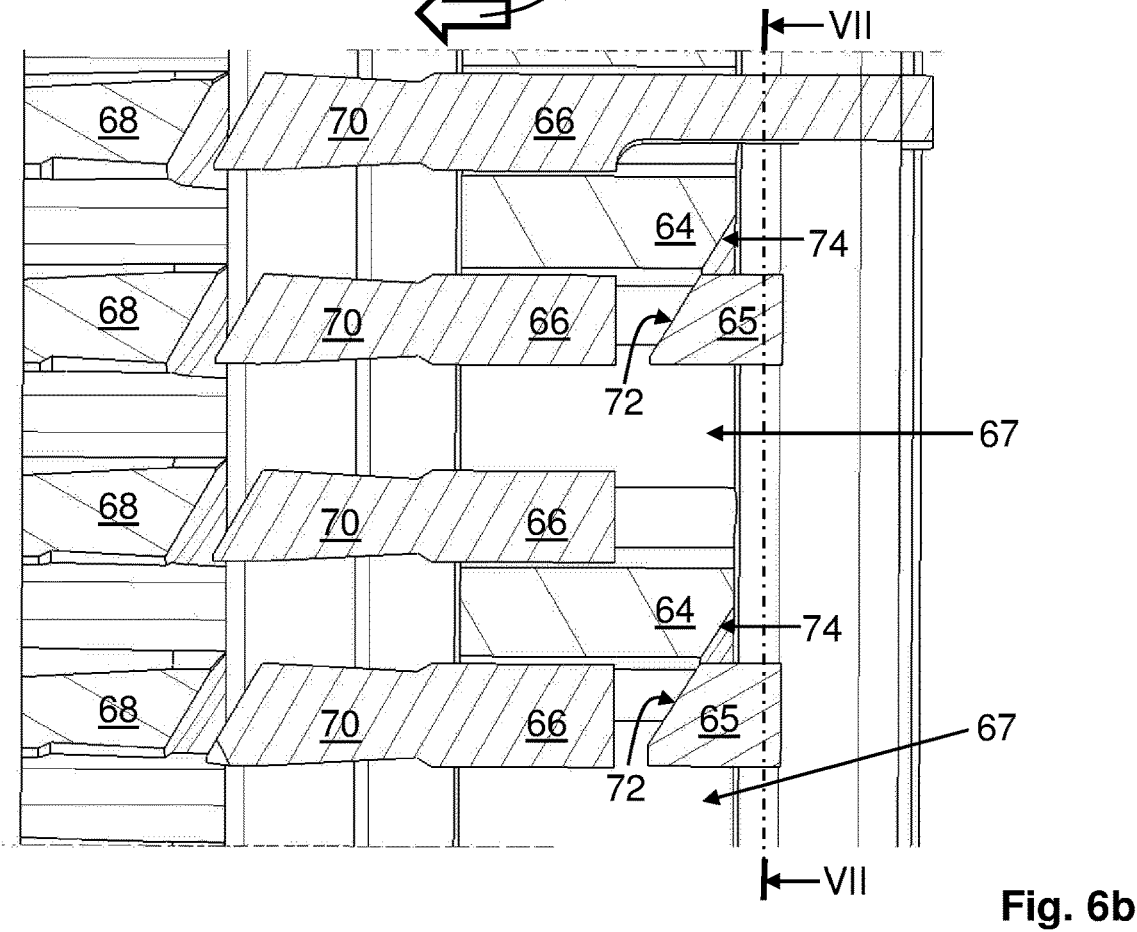

In FIG. 6b, the synchronizer ring 50 is in the release position. The protrusions 65 of the synchronizer ring 50 are circumferentially positioned between the splines 64 of the planet gear carrier 44 and thus, axially moveable in between the splines 64.

According to embodiments, the release position of the synchronizer ring 50 may be reachable by a first relative rotation between the synchronizer ring 50 and the coupling sleeve 48 in a first circumferential direction. The first relative rotation may be permitted by the rotational play i.e., the rotational play between the synchronizer ring 50 and the coupling sleeve 48. In this manner, the release position may be provided.

Since the first circumferential direction represents a relative rotation between the synchronizer ring 50 and the coupling sleeve 48, the first circumferential direction may be e.g. counter-clockwise for the synchronizer ring 50 and clockwise for the coupling sleeve 48.

What is relevant is that the first relative rotation causes the synchronizer ring 50 to rotate in the direction opposite to the direction, in which the synchronizer ring 50 was forced by the ring gear 40 while the synchronizer ring 50 synchronized the speed of the ring gear 40.

The first relative rotation in the first circumferential direction may be achieved by respective angled axial surfaces 72, 74 of the protrusions 65 of the synchronizer ring 50 and the splines 64 of the planet gear carrier 44.

In the blocking position, during the synchronization of the ring gear 40, the angled axial surfaces 72, 74 of the protrusions 65 and the splines 64 may abut against each other. As long as the rotational speed difference during synchronization forces the synchronizer ring 50 with the protrusion 65 against the rotational direction of the coupling sleeve 48, no relative sliding between the protrusions 65 and the splines 64 along the angled axial surfaces 72, 74 may occur. Once the rotational speeds are synchronized, relative sliding between the protrusions 65 and the splines 64 along the angled axial surfaces 72, 74 may occur.

Figure 7:
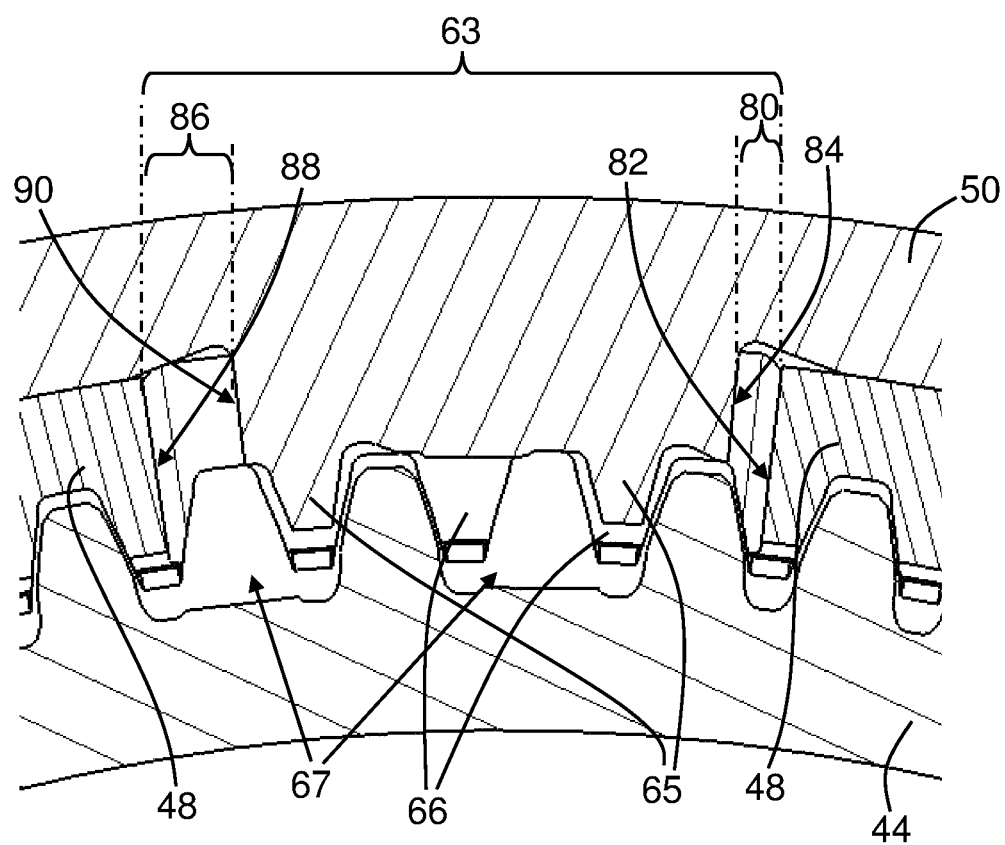
FIG. 7 illustrates a partial axial cross section through parts of a transmission.

The above discussed first relative rotation between the synchronizer ring 50 and the coupling sleeve 48 has been performed in FIG. 6b by relative sliding along the angled axial surfaces 72, 74 of between the protrusions 65 and the splines 64, see also FIG. 7.

According to embodiments, in the release position of the synchronizer ring 50, the coupling sleeve 48 may be moveable in the first direction 52 towards the engaged position.

Figure 6C:
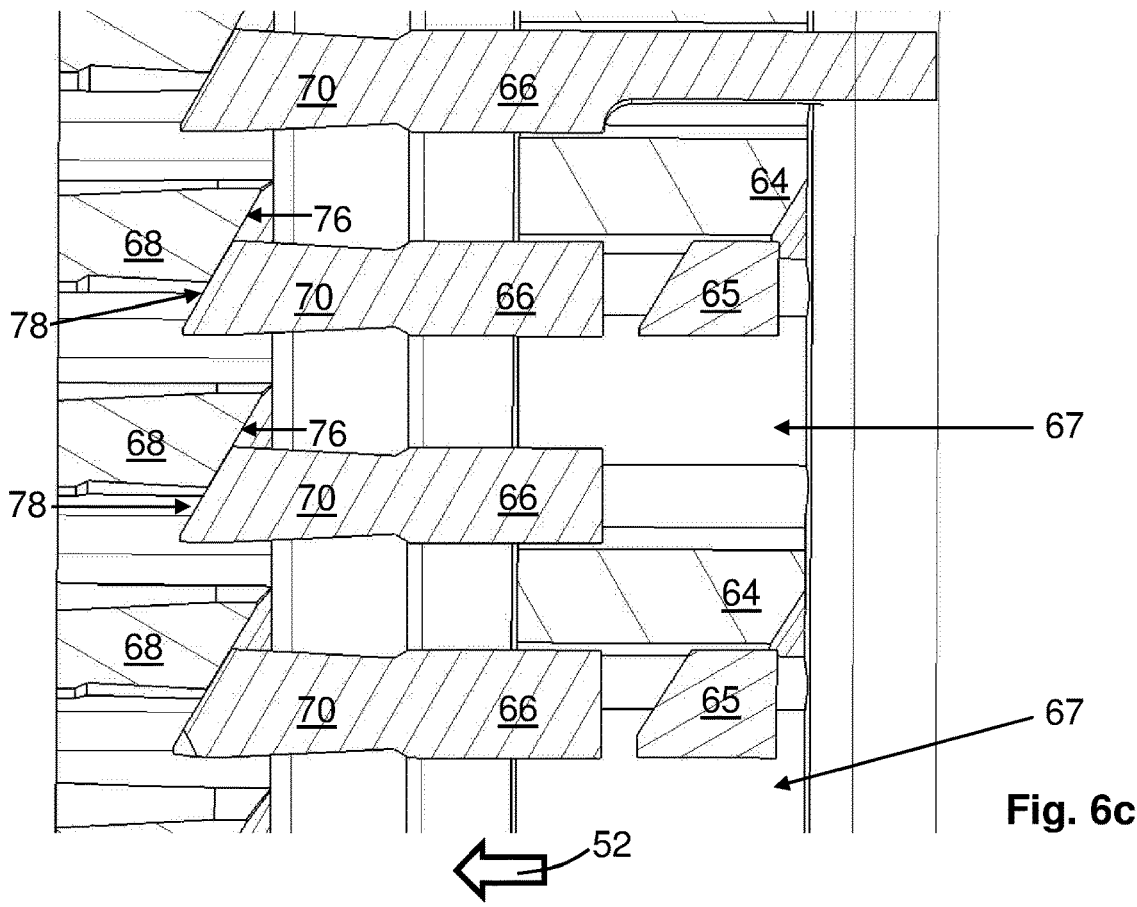

In FIG. 6c, the synchronizer ring 50, in its release position, has been moved in the first direction 52 with the protrusions 65 in between the splines 64 of the planet gear carrier 44. Accordingly, also the coupling sleeve 48 has been moved in the first direction 52. That is, in the release position of the synchronizer ring 50, the coupling sleeve 48 is further moveable in the first direction 52 by the ring gear 40 and/or the synchronizer ring 50.

According to embodiments, upon movement of the coupling sleeve 48 in the first direction 52 when the synchronizer ring 50 is in the release position, the rotational play may permit a second relative rotation between on the one hand the planet gear carrier 44 and the coupling sleeve 48 and on the other hand the coupling disc 46. In this manner, the second relative rotation may provide for the external and internal splines 68, 70 of the second splined connection 68, 70 to be rotationally arranged for engagement therebetween in the engaged position of the coupling sleeve 48 with the coupling disc 46.

According to embodiments, in the release position, the synchronizer ring 50 may be subjectable to a second relative rotation between the synchronizer ring 50 and the coupling sleeve 48 in the first circumferential direction. The second relative rotation may be permitted by the rotational play. After the second relative rotation, the external splines 68 arranged on the coupling disc 46 and the internal splines 70 arranged at a radially inner portion of the coupling sleeve 48 are arranged circumferentially offset from each other such that the coupling sleeve 48 is moveable in the first direction 52 to reach the engaged position. In this manner, the external and internal splines 68, 70 of the second splined connection 68, 70 may be arranged for engagement therebetween in the engaged position of the coupling sleeve 48 with the coupling disc 46.

According to embodiments, the external splines 68 arranged on the coupling disc 46 and the internal splines 70 arranged at a radially inner portion of the coupling sleeve 48 may comprise angled axial end surfaces 76, 78 facing each other, wherein an abutment between the angled axial end surface 76, 78 of the external and internal splines 68, 70 while the coupling sleeve 48 is moved in the first direction 52 towards the engaged position may causes the second relative rotation. In this manner, the external and internal splines 68, 70 of the second splined connection 68, 70 may be arranged for engagement therebetween in the engaged position of the coupling sleeve 48 with the coupling disc 46.

In FIG. 6c, the angled axial surfaces 76, 78 of the external and internal splines 68, 70 of the second splined connection 68, 70 are shown in abutment with each other. The movement of the coupling sleeve 48 in the first direction 52 and the angle of the angled surfaces 76,78 causes the external and internal splines 68, 70 to slide in relation to each other and thus, cause the second relative rotation between the synchronizer ring 50 and the coupling sleeve 48.

Figure 6D:
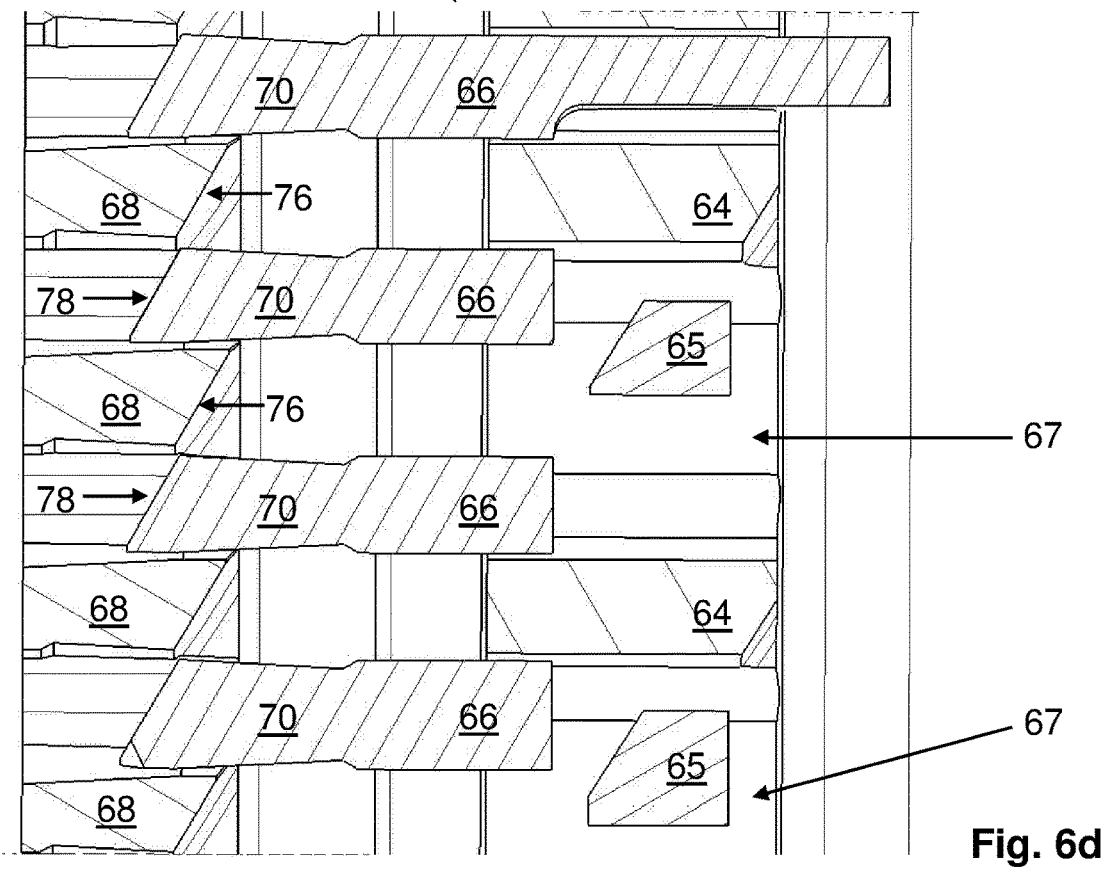

More specifically, the movement of the coupling sleeve 48 in the first direction 52 and the abutment and sliding between the angled surfaces 76,78 causes the coupling disc 46 to rotated in relation to the coupling sleeve 48. Thus, the external and internal splines 68, 70 will be positioned to reach the engaged position, as shown in FIG. 6d. Moreover, since the coupling disc 46 is rotationally locked to the input shaft 30 and the sun gear 38, the rotation of the coupling disc 46 in relation to the coupling sleeve 48 will adjust the rotational position of the ring gear 40 and the synchronizer ring 50 in relation to the ring gear carrier 44 and the coupling sleeve 48 via the at least one planet gear 42.

The thus, adjusted rotational position of the ring gear 40 and the synchronizer ring 50 in relation to the ring gear carrier 44 and the coupling sleeve 48 corresponds to the second relative rotation between the synchronizer ring 50 and the coupling sleeve 48.

In FIG. 6d, the second relative rotation has been completed and the second splined connection 68, 70 can be brought into engagement by moving the coupling sleeve 48 further in the first direction 52.

The circumferential gaps 67 in the external splines 64 of the planet gear carrier 44 provide space for the protrusions 65 of the synchronizer ring 50 and thus, permit the second relative rotation between the synchronizer ring 50 and the coupling sleeve 48. Put differently, without providing for the second relative rotation, engagement of the second splined connection 68, 70 and the reaching of the engaged position might be difficult or not possible.

FIG. 7 illustrates a partial axial cross section through the planet gear carrier 44, the coupling sleeve 48, and the synchronizer ring 50 along line VII-VII in FIG. 6b.

In FIG. 7, also the axial recesses 63 in the coupling sleeve 48, the radially inwardly directed protrusions 65 of the synchronizer ring 50, and the circumferential gaps 67 in the external splines 64 of the planet gear carrier 44 are clearly shown.

From FIG. 7 also the rotational play of the synchronizer ring 50 in relation to the coupling sleeve 48, which permits the first and second relative rotations are visible.

As in FIG. 6b, also in FIG. 7, the synchronizer ring 50 is in the release position of the synchronizer ring 50. The protrusions 65 are axially aligned with the splines 66 of the coupling sleeve 48. The release position has been reached by the first relative rotation between the synchronizer ring 50 and the coupling sleeve 48 in the first circumferential direction, as discussed above.

The first relative rotation has caused a first gap 80 within the axial recess 63 of the coupling sleeve 48 between a first radial edge 82 of the axial recess 63 and a first radial edge 84 of the protrusions 65 of the synchronizer ring 50.

Space for the protrusions 65 and the second relative rotation between the synchronizer ring 50 and the coupling sleeve 48 is provided by the circumferential gaps 67 in the splines 64 of the planet gear carrier 44 and a second gap 86 within the axial recess 63 between a second radial edge 88 of the axial recess 63 and a second radial edge 90 of the protrusions 65.

Figure 8:
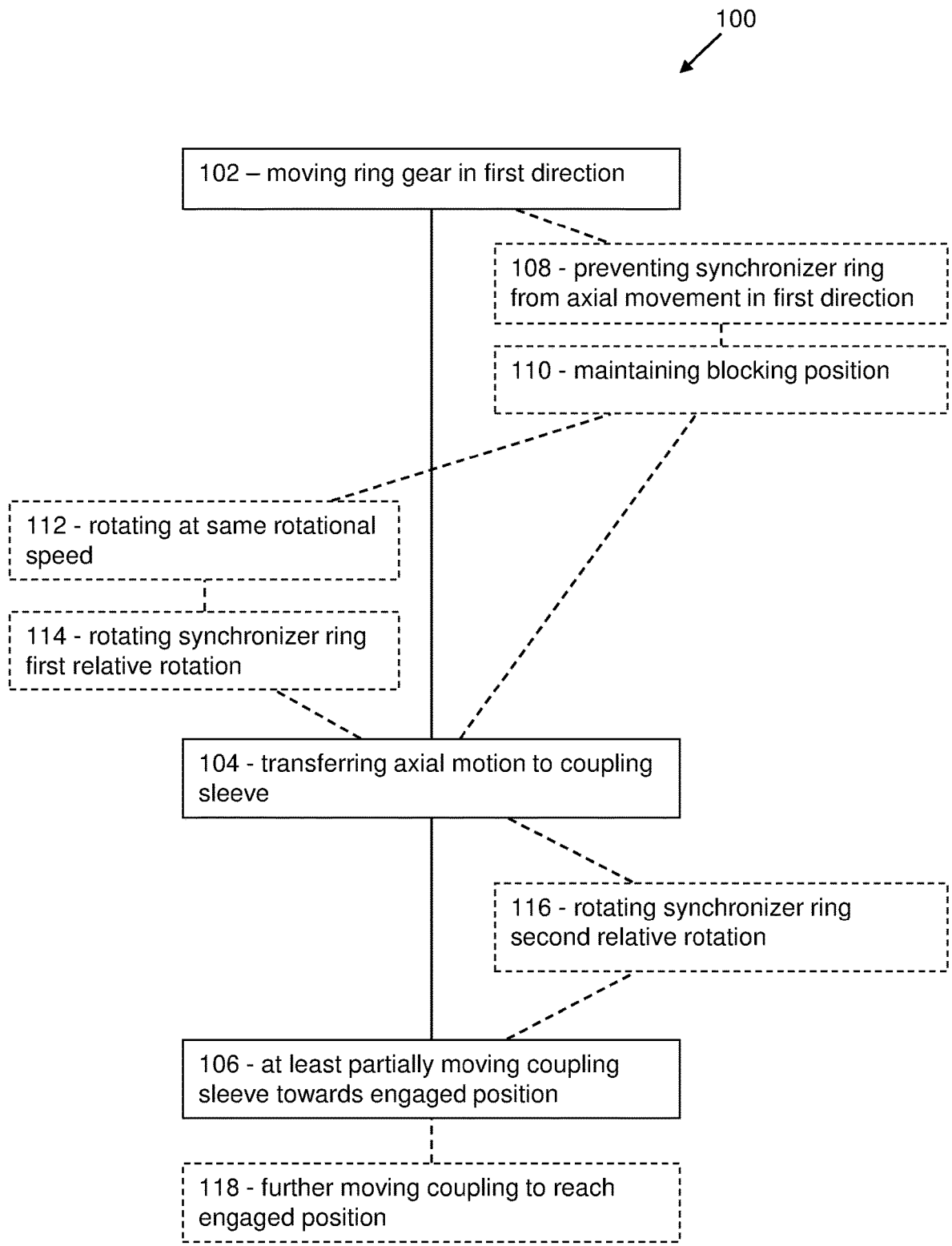
FIG. 8 illustrates embodiments of a method of shifting a transmission.

FIG. 8 illustrates embodiments of a method 100 of shifting a transmission. The transmission may be a transmission 6 as discussed herein. Accordingly, in the following reference is also made to FIGS. 1-7.

Accordingly, the transmission 6 comprises an input shaft 30, an output shaft 32, and a planetary gearset 34 being driven by the input shaft 30 and being couplable to the output shaft 32 in a high gear mode and a low gear mode of the transmission 6, the input and output shafts 30, 32 being arranged rotatably and coaxially along an axis 36. The planetary gearset 34 comprises a sun gear 38 connected to the input shaft 30, a ring gear 40 that is axially movable, and at least one planet gear 42 rotatably supported on a planet gear carrier 44 that is connected to the output shaft 32. The transmission 6 further comprises a coupling disc 46 connected to the input shaft 30, an axially moveable coupling sleeve 48, and a synchronizer ring 50 arranged between the coupling sleeve 48 and the ring gear 40. In order to connect the planet gear carrier 44 with the coupling disc 46 in an engaged position of the coupling sleeve 48 to provide the high gear mode, the method 100 comprises steps of:

moving 102 the ring gear 40 in an axial motion in a first direction 52 towards the coupling sleeve 48 and the coupling disc 46, transferring 104 via the synchronizer ring 50 the axial motion of the ring gear 40 to the coupling sleeve 48, at least partially moving 106 the coupling sleeve 48 with the synchronizer ring 50 from an unengaged position towards the engaged position.

The step of moving 102 the ring gear 40 in an axial motion in the first direction 52 may lead to the ring gear 40 frictionally engaging with the synchronizer ring 50 to synchronize the rotational speed of the ring gear 40 with that of the planet gear carrier 44 and the coupling sleeve 48.

The step of transferring 104 via the synchronizer ring 50 the axial motion of the ring gear 40 to the coupling sleeve 48, may be performed once the rotational speed of the ring gear 40 has been synchronizer with that of the planet gear carrier 44 and the coupling sleeve 48.

The at least partial movement of the step of at least partially moving 106 is shown in sequence in FIGS. 6a and 6b and discussed above and/or in sequence in FIGS. 6a-6c and discussed above.

The full movement of the coupling sleeve 48 from the unengaged position into the engaged position is shown in sequence in FIGS. 6a-6d and discussed above.

According to embodiments, the method 100 may comprise further steps of:

preventing 108 the synchronizer ring 50 from axial movement in the first direction 52 in a blocking position of the synchronizer ring 50, maintaining 110 the blocking position while there remains a rotational speed difference between the ring gear 40 on the one hand and the synchronizer ring 50 and the coupling sleeve 48 on the other hand. In this manner, the coupling sleeve 48 is prevented from moving in the first direction 52 until the speed of the ring gear 40 has been synchronized.

For instance, the step of preventing 108 the synchronizer ring 50 from axial movement in the first direction 52 in a blocking position and the step of maintaining 110 the blocking position while the rotational speed difference remains, may be performed after the step of moving 102 the ring gear 40 in an axial motion in the first direction 52 and before the step of transferring 104 via the synchronizer ring 50 the axial motion of the ring gear 40 to the coupling sleeve 48.

According to embodiments, after the step of maintaining 110 the blocking position, the method 100 may comprise a step of:

rotating 112 the ring gear 40, the synchronizer ring 50, and the coupling sleeve 48 at the same rotational speed, and preceding the step of transferring 104 via the synchronizer ring 50 the axial motion of the ring gear 40 to the coupling sleeve 48, the method 100 may comprise a step of:

rotating 114 the synchronizer ring 50 a first relative rotation in a first circumferential direction relative to the coupling sleeve 48 into a release position, and with the synchronizer ring 50 in the release position, the step of at least partially moving 106 the coupling sleeve 48 with the synchronizer ring 50 from the unengaged position towards the engaged position may be performed.

In this manner, the rotational speed of the ring gear 40 may be synchronized with that of the synchronizer ring 50, the coupling sleeve 48, and the planet gear carrier 44, to thereafter move the synchronizer ring 50 into its release position in order to move the coupling sleeve 48 towards the engaged position.

The step of rotating 114 the synchronizer ring 50 a first relative rotation in a first circumferential direction relative to the coupling sleeve 48 into a release position is shown in sequence in FIGS. 6a and 6b.

According to embodiments, wherein the coupling sleeve 48 and the coupling disc 46 are engageable in the engaged position via a splined connection 68, 70 between the coupling sleeve 48 and the coupling disc 46, the splined connection 68, 70 between the coupling sleeve 48 and the coupling disc 46 comprising external splines 68 arranged on the coupling disc 46 and internal splines 70 arranged at a radially inner portion of the coupling sleeve 48, the method 100 may comprise further steps of:

from the release position, rotating 116 the synchronizer ring 50 a second relative rotation in the first circumferential direction relative to the coupling sleeve 48, such that the external and internal splines 68, 70 are arranged circumferentially offset from each, and further moving 118 the coupling sleeve 48 in the first direction 52 to reach the engaged position. In this manner, the splined connection 68, 70 between the coupling sleeve 48 and the coupling disc 46 may be positioned to permit the coupling sleeve 48 to move into its engaged position and thus, provide the high gear mode of the transmission 6.

The steps of rotating 116 the synchronizer ring 50 the second relative rotation and further moving 118 the coupling sleeve 48 in the first direction 52 to reach the engaged position are shown in sequence in FIGS. 6c and 6d.

As discussed above with reference to FIGS. 6c and 6d, the step of rotating 116 the synchronizer ring 50 a second relative rotation in the first circumferential direction relative to the coupling sleeve 48 may be provided by a rotation of the coupling disc 46 in relation to the coupling sleeve 48, which rotation will provide the second relative rotation by adjust the rotational position of the ring gear 40 and the synchronizer ring 50 in relation to the ring gear carrier 44 and the coupling sleeve 48 via the at least one planet gear 42.

The step of further moving 118 the coupling sleeve 48 in the first direction 52 to reach the engaged position may form part of, or may be performed subsequently to, the step of at least partially moving 106 the coupling sleeve 48 with the synchronizer ring 50 from an unengaged position towards the engaged position.

External splines discussed herein relate to splines extending radially outwardly from a member, such as the coupling disc or the planet gear carrier. Consequently, internal splines discussed herein relate to splines extending radially inwardly from a member, such as the coupling sleeve.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A transmission comprising:
an input shaft;
an output shaft;
a planetary gearset being driven by the input shaft and being couplable to the output shaft in a high gear mode and a low gear mode of the transmission, wherein the input and output shafts are arranged rotatably and coaxially along an axis, and wherein the planetary gearset comprises a sun gear connected to the input shaft, a ring gear that is axially movable, and at least one planet gear rotatably supported on a planet gear carrier that is connected to the output shaft;
a coupling disc connected to the input shaft;
an axially moveable coupling sleeve being configured to selectively connect the planet gear carrier with the coupling disc in an engaged position of the coupling sleeve to provide the high gear mode; and
a synchronizer ring arranged between the coupling sleeve and the ring gear,
wherein the synchronizer ring is configured to transfer an axial motion of the ring gear in a first direction towards the coupling sleeve and the coupling disc, and
wherein the coupling sleeve is moveable from an unengaged position into the engaged position at least in part by the synchronizer ring.

2. The transmission according to claim 1, wherein the ring gear comprises an outer conical surface and the synchronizer ring comprises one or more inner surfaces configured to abut against the outer conical surface.

3. The transmission according to claim 1,
wherein the coupling sleeve is rotationally locked to the planet gear carrier by a first splined connection, and
wherein the first splined connection comprises external splines arranged on the planet gear carrier and internal splines arranged at a radially inner portion of the coupling sleeve.

4. The transmission according to claim 1,
wherein the coupling sleeve and the coupling disc are engageable in the engaged position via a second splined connection, and
wherein the second splined connection comprises external splines arranged on the coupling disc and internal splines arranged at a radially inner portion of the coupling sleeve.

5. The transmission according to claim 1, wherein the synchronizer ring is arranged to engage with the coupling sleeve in a circumferential direction and arranged with a rotational play in relation to the coupling sleeve.

6. The transmission according to claim 1,
wherein in a blocking position of the synchronizer ring, the synchronizer ring is prevented from axial movement in the first direction, and
wherein the blocking position is maintained while there remains a rotational speed difference between the ring gear on the one hand and the synchronizer ring and the coupling sleeve on the other hand.

7. The transmission according to claim 1,
wherein in a release position of the synchronizer ring, the synchronizer ring is axially moveable in the first direction, and
wherein in the release position the coupling sleeve is axially moveable in the first direction by the synchronizer ring and/or the ring gear.

8. The transmission according to claim 7,
wherein the synchronizer ring is arranged to engage with the coupling sleeve in a circumferential direction and arranged with a rotational play in relation to the coupling sleeve,
wherein the release position of the synchronizer ring is reachable by a first relative rotation between the synchronizer ring and the coupling sleeve in a first circumferential direction, and
wherein the first relative rotation is permitted by the rotational play.

9. The transmission according to claim 8, wherein upon movement of the coupling sleeve in the first direction when the synchronizer ring is in the release position, the rotational play permits a second relative rotation between on the one hand the planet gear carrier and the coupling sleeve and on the other hand the coupling disc.

10. The transmission according to claim 9,
wherein the coupling sleeve and the coupling disc are engageable in the engaged position via a second splined connection,
wherein the second splined connection comprises external splines arranged on the coupling disc and internal splines arranged at a radially inner portion of the coupling sleeve,
wherein the external splines arranged on the coupling disc and the internal splines arranged at a radially inner portion of the coupling sleeve comprise angled axial end surfaces facing each other, and
wherein an abutment between the angled axial end surface of the external and internal splines while the coupling sleeve is moved in the first direction towards the engaged position causes the second relative rotation.

11. The transmission according to claim 9,
wherein in the release position, the synchronizer ring is subjectable to a second relative rotation between the synchronizer ring and the coupling sleeve in the first circumferential direction,
wherein the second relative rotation is permitted by the rotational play, and
wherein after the second relative rotation, the external splines arranged on the coupling disc and the internal splines arranged at a radially inner portion of the coupling sleeve are arranged circumferentially offset from each other such that the coupling sleeve is moveable in the first direction to reach the engaged position.

12. The transmission according to claim 8,
wherein in the release position, the synchronizer ring is subjectable to a second relative rotation between the synchronizer ring and the coupling sleeve in the first circumferential direction,
wherein the second relative rotation is permitted by the rotational play, and
wherein after the second relative rotation, the external splines arranged on the coupling disc and the internal splines arranged at a radially inner portion of the coupling sleeve are arranged circumferentially offset from each other such that the coupling sleeve is moveable in the first direction to reach the engaged position.

13. The transmission according to claim 12,
wherein the coupling sleeve and the coupling disc are engageable in the engaged position via a second splined connection,
wherein the second splined connection comprises external splines arranged on the coupling disc and internal splines arranged at a radially inner portion of the coupling sleeve, wherein the external splines arranged on the coupling disc and the internal splines arranged at a radially inner portion of the coupling sleeve comprise angled axial end surfaces facing each other, and wherein an abutment between the angled axial end surface of the external and internal splines while the coupling sleeve is moved in the first direction towards the engaged position causes the second relative rotation.

14. The transmission according to claim 7, wherein in the release position of the synchronizer ring, the coupling sleeve is moveable in the first direction towards the engaged position.

15. A powertrain for a vehicle, said powertrain comprising:
at least one torque source having a rotor; and
a transmission connected to the rotor, said transmission comprising:
an input shaft;
an output shaft;
a planetary gearset being driven by the input shaft and being couplable to the output shaft in a high gear mode and a low gear mode of the transmission, wherein the input and output shafts are arranged rotatably and coaxially along an axis, and wherein the planetary gearset comprises a sun gear connected to the input shaft, a ring gear that is axially movable, and at least one planet gear rotatably supported on a planet gear carrier that is connected to the output shaft;
a coupling disc connected to the input shaft;
an axially moveable coupling sleeve being configured to selectively connect the planet gear carrier with the coupling disc in an engaged position of the coupling sleeve to provide the high gear mode; and
a synchronizer ring arranged between the coupling sleeve and the ring gear,
wherein the synchronizer ring is configured to transfer an axial motion of the ring gear in a first direction towards the coupling sleeve and the coupling disc, and
wherein the coupling sleeve is moveable from an unengaged position into the engaged position at least in part by the synchronizer ring.

16. A vehicle comprising a powertrain, said powertrain comprising:
at least one torque source having a rotor; and
a transmission connected to the rotor, said transmission comprising:
an input shaft;
an output shaft;
a planetary gearset being driven by the input shaft and being couplable to the output shaft in a high gear mode and a low gear mode of the transmission, wherein the input and output shafts are arranged rotatably and coaxially along an axis, and wherein the planetary gearset comprises a sun gear connected to the input shaft, a ring gear that is axially movable, and at least one planet gear rotatably supported on a planet gear carrier that is connected to the output shaft;
a coupling disc connected to the input shaft;
an axially moveable coupling sleeve being configured to selectively connect the planet gear carrier with the coupling disc in an engaged position of the coupling sleeve to provide the high gear mode; and
a synchronizer ring arranged between the coupling sleeve and the ring gear,
wherein the synchronizer ring is configured to transfer an axial motion of the ring gear in a first direction towards the coupling sleeve and the coupling disc, and
wherein the coupling sleeve is moveable from an unengaged position into the engaged position at least in part by the synchronizer ring.

17. The vehicle according to claim 16, wherein the at least one torque source comprises an electric machine.

18. A method of shifting a transmission, wherein the transmission comprises an input shaft, an output shaft, and a planetary gearset being driven by the input shaft and being couplable to the output shaft in a high gear mode and a low gear mode of the transmission, the input and output shafts being arranged rotatably and coaxially along an axis, wherein the planetary gearset comprises a sun gear connected to the input shaft, a ring gear that is axially movable, and at least one planet gear rotatably supported on a planet gear carrier that is connected to the output shaft, wherein the transmission further comprises a coupling disc connected to the input shaft, an axially moveable coupling sleeve, and a synchronizer ring arranged between the coupling sleeve and the ring gear, and
wherein in order to connect the planet gear carrier with the coupling disc in an engaged position of the coupling sleeve to provide the high gear mode, the method comprises:
moving the ring gear in an axial motion in a first direction towards the coupling sleeve and the coupling disc;
transferring via the synchronizer ring the axial motion of the ring gear to the coupling sleeve; and
at least partially moving the coupling sleeve with the synchronizer ring from an unengaged position towards the engaged position.

19. The method according to claim 18 further comprising:
preventing the synchronizer ring from axial movement in the first direction in a blocking position of the synchronizer ring; and
maintaining the blocking position while there remains a rotational speed difference between the ring gear on the one hand and the synchronizer ring and the coupling sleeve on the other hand.

20. The method according to claim 19, wherein after the step of maintaining the blocking position, the method comprises:
rotating the ring gear, the synchronizer ring, and the coupling sleeve at the same rotational speed; and
preceding the step of transferring via the synchronizer ring the axial motion of the ring gear to the coupling sleeve, the method comprises:
rotating the synchronizer ring a first relative rotation in a first circumferential direction relative to the coupling sleeve into a release position, and
with the synchronizer ring in the release position, the step of at least partially moving the coupling sleeve with the synchronizer ring from the unengaged position towards the engaged position is performed.

21. The method according to claim 20, wherein the coupling sleeve and the coupling disc are engageable in the engaged position via a splined connection between the coupling sleeve and the coupling disc, the splined connection between the coupling sleeve and the coupling disc comprising external splines arranged on the coupling disc and internal splines arranged at a radially inner portion of the coupling sleeve, the method further:

from the release position, rotating the synchronizer ring a second relative rotation in the first circumferential direction relative to the coupling sleeve, such that the external and internal splines are arranged circumferentially offset from each; and further moving the coupling sleeve in the first direction to reach the engaged position.

\* \* \* \* \*